United States Patent [19]

Fujieda et al.

[11] Patent Number: 4,775,954
[45] Date of Patent: Oct. 4, 1988

[54] APPARATUS FOR GENERATING TIMING SIGNALS USED FOR TESTING ICS HAVING TWO ENABLE INPUT TERMINALS

[75] Inventors: Takanori Fujieda; Tadatoshi Miyagawa, both of Tokyo, Japan

[73] Assignee: Ando Electric Co., Ltd, Tokyo, Japan

[21] Appl. No.: 913,037

[22] Filed: Sep. 29, 1986

[30] Foreign Application Priority Data

Oct. 2, 1985 [JP] Japan ................. 60-219667

[51] Int. Cl.⁴ ................. G01R 31/28; H03L 7/00
[52] U.S. Cl. ................. 364/900; 307/269; 371/27
[58] Field of Search ... 364/200 MS File, 900 MS File, 364/701; 377/20, 27, 49, 52; 307/271, 269; 328/18, 129.1; 371/21, 27; 324/73 R, 73 AT; 365/201

[56] References Cited

U.S. PATENT DOCUMENTS

| 3,952,253 | 4/1976 | DeVolp et al. ................. 328/63 |
| 4,131,855 | 12/1978 | Hamagawa ................. 328/129.1 |
| 4,306,190 | 12/1981 | Beckwith et al. ................. 307/271 |
| 4,450,560 | 5/1984 | Conner ................. 371/27 |
| 4,523,289 | 6/1985 | Soma et al. ................. 377/20 |
| 4,555,663 | 11/1985 | Shimizu ................. 371/27 |
| 4,573,175 | 2/1986 | Cressey et al. ................. 307/271 |
| 4,584,683 | 4/1986 | Shimizu ................. 371/27 |
| 4,680,479 | 7/1987 | Alonso ................. 307/271 |
| 4,719,375 | 1/1989 | Martin ................. 328/63 |

FOREIGN PATENT DOCUMENTS

| 0208049 | 1/1987 | European Pat. Off. ............ 307/269 |
| 0067869 | 4/1985 | Japan ................. 307/269 |
| 0096023 | 5/1985 | Japan ................. 307/269 |
| 0075615 | 4/1986 | Japan ................. 307/269 |
| 2070827 | 9/1981 | United Kingdom ............... 307/269 |

Primary Examiner—Raulfe B. Zache
Assistant Examiner—Florin Munteanu
Attorney, Agent, or Firm—Seidel, Gonda, Lavorgna & Monaco

[57] ABSTRACT

A timing signal generating apparatus is used for testing ICs, particularly ICs having more than two enable input terminals. Data representative of the time of occurrence of a timing signal with respect to a reference signal is stored in a memory. In a first cycle, data is combined by an arithmetic unit with data stored in another memory. The latter data represents a predetermined desired variation in the time of occurrence of the timing signal. The output of the arithmetic unit is then stored in a temporary memory and combined with the data representative of the predetermined variation in time of occurrence of the timing signal. The time of occurrence of the timing signal is determined by the output of the arithmetic unit. A timing signal is thus produced over an almost arbitrary range of delays with respect to the reference signal.

3 Claims, 3 Drawing Sheets

Address 11

Ref. Signal 12

Data 13

Timing Signal 14

Fig. 4(a) Address 11
Fig. 4(b) Ref. Signal 12
Fig. 4(c) Data 13
Fig. 4(d) Data 21
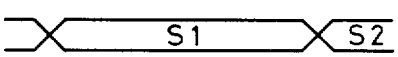
Fig. 4(e) Data 22
Fig. 4(f) Data 23
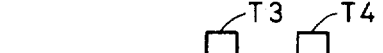
Fig. 4(g) Timing Signal 14
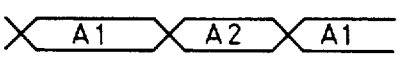
Fig. 5(a) Address 11
Fig. 5(b) Ref. Signal 12
Fig. 5(c) Data 24
Fig. 5(d) Data 21
Fig. 5(e) Data 22
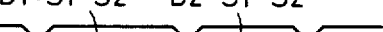
Fig. 5(f) Data 23
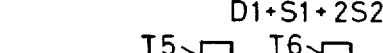
Fig. 5(g) Timing Signal 14

APPARATUS FOR GENERATING TIMING SIGNALS USED FOR TESTING ICS HAVING TWO ENABLE INPUT TERMINALS

BACKGROUND OF THE INVENTION

1. Field of the Invention

The present invention relates to a timing signal generating apparatus for generating timing signals asynchronously with a reference signal.

2. Description of the Prior Art

For having a better understanding of the present invention, description will be made on the hitherto known relevant technique in some detail. FIG. 2 of the accompanying drawings shows a typical one of the conventional timing signal generating apparatus. In the figure, a reference numeral 1 denotes a controller, 2 denotes a signal generator, 3 denotes a memory and a numeral 4 denotes a counter. The controller 1 supplies an address signal 11 to the signal generator 2 and the memory 3. In response, the signal generator 2 produces a reference signal 12 which provides a basis for a test cycle. The counter 4 counts the content of data read out from the memory 3 in response to the address signal 11 from the controller 1, starting from the rise-up of the reference signal pulse 12, and produces a timing signal 14 at the output thereof. Consequently, the timing signal 14 undergoes an amount of delay which corresponds to the time required for the counter 4 to count the data content read out from the designated address of the memory 3. In this manner, a number of discrete timing signals 14 can be derived which number corresponds to that of the data contents stored in the memory 3.

FIG. 3 of the accompanying drawings shows waveforms or sequences of signals making appearance at various circuit points of the arrangement shown in FIG. 2. More specifically, FIG. 3 shows at (a) the address signal 11 produced by the controller 1, wherein address A1 and A2 are indicated, by way of example. FIG. 3(b) is a waveform diagram of the reference signal 12 produced by the signal generator 2, in which reference pulses P1 and P2 are shown. FIG. 3(c) shows the data 13 stored in the memory 3, which data includes data contents D1 and D2, as will be seen. More specifically, the data content D1 is stored in the memory 3 at the address A1, while the data content D2 is located at the address A2 of the memory 3.

Turning to FIG. 2, the counter 4 is loaded with the content D1 of data 13 in synchronism with the pulse P1 of the reference signal 12. Subsequently, the data content D2 is loaded in the counter 4 in synchronism with the timing pulse P2.

FIG. 3 shows at (d) the timing signals 14 outputted by the counter 4 and containing pulse T1 and T2, respectively. It will be seen that the timing signal pulse T1 is produced with a delay relative to the rise-up of the reference signal pulse P1, which delay corresponds to the time required for the counter 4 to count the data content D1 of the data 13. On the other hand, the timing signal pulse T2 is delayed relative to the rise-up of the reference signal pulse P2 for a time required for counting the data content D2. In this connection, it is assumed that the data content D1 represents "100". Then the timing signal pulse T1 is produced after the counter 4 has counted "100". Further, assuming that the data content D2 represents "150", the timing signal pulse T2 is produced when the counter 4 has made 150 counts. In this way, with the arrangement of the hitherto known timing signal generating circuit shown in FIG. 2, the pulses T1 and T2 are produced as the timing signals 14 with delays relative to the reference signal 12 which correspond, respectively, to the times taken for counting the data contents D1 and D2 stored in the memory 3.

It is however noted that the amount of data capable of being stored in the memory 3 is finite, which in turn means that difficulty is encountered in producing a large variety of timing pulse signals 14 (T1,T2) having periods differing from that of the reference signal 12.

Some of the memories implemented in the form of IC (integrated circuit) is provided with an additional input or enable terminal for the purpose of allowing information or data to be read out from the IC memory at high speed with high efficiency in addition to the conventional write-in and read-out enable terminals. In such memory device, test is often conducted for checking the mutual influence between the two read-out enable terminals. To ths end, a timing clock is applied to the additional enable terminal which is utterly independent of the timing signal applied to the other conventional read-out enable terminal. In that case, a timing signal generating apparatus is additionally required for generating the timing signal having a period which can vary within a predetermined range in addition to the conventional timing signal generator inherently designed for the test in concern.

The number of the various timing signals can naturally be increased by correspondingly increasing the oscillation frequency of the signal generator 2 and the capacity of the memory 3. In that case, however, problem will arise in that a large amount of data has to be loaded in the memory 3 in precedence to the test, being undesirably accompanied with the increased number of addresses 11, whereby the control procedure becomes correspondingly complicated, to another disadvantage.

SUMMARY OF THE INVENTION

It is therefore an object of the present invention to provide a timing signal generating apparatus in which the timing signals having respective periods differing from that of the reference signal can be arbitrarily produced by adding or subtracting data to or from those stored in the memory without increasing the capacity thereof.

In view of the above object, there is provided according to a general aspect of the present invention a timing signal generating apparatus constituted by a controller, a signal generator, a first memory and a counter, which apparatus further comprises a selector for selecting one of two inputs to be outputted, a second memory for storing data to be arithmetically processed, an arithmetic unit having inputs supplied with the output of the selector and the output of the second memory, and a temporary memory having input supplied with the output of the arithmetic unit, the outputs of the first memory and the temporary memory constituting the inputs to the selector, wherein the timing signals which are asynchronous with the output of the signal generator are derived from the output of the counter having the input coupled to the output of the arithmetic unit.

The above and other objects, features and advantages of the present invention will be apparent upon reading the following detailed description of the preferred embodiments taken in conjunction with the drawings.

BRIEF DESCRIPTION OF THE DRAWINGS

FIG. 4 (a-g) shows timing diagrams for illustration operation of the apparatus shown in FIG. 1; and FIG. 5 (a-g) is a timing diagram for illustrating operation of the apparatus shown in FIG. 1 in a cycle succeeding to the operation illustrated in FIG. 4.

DESCRIPTION OF THE PREFERRED EMBODIMENTS

Figure 1:
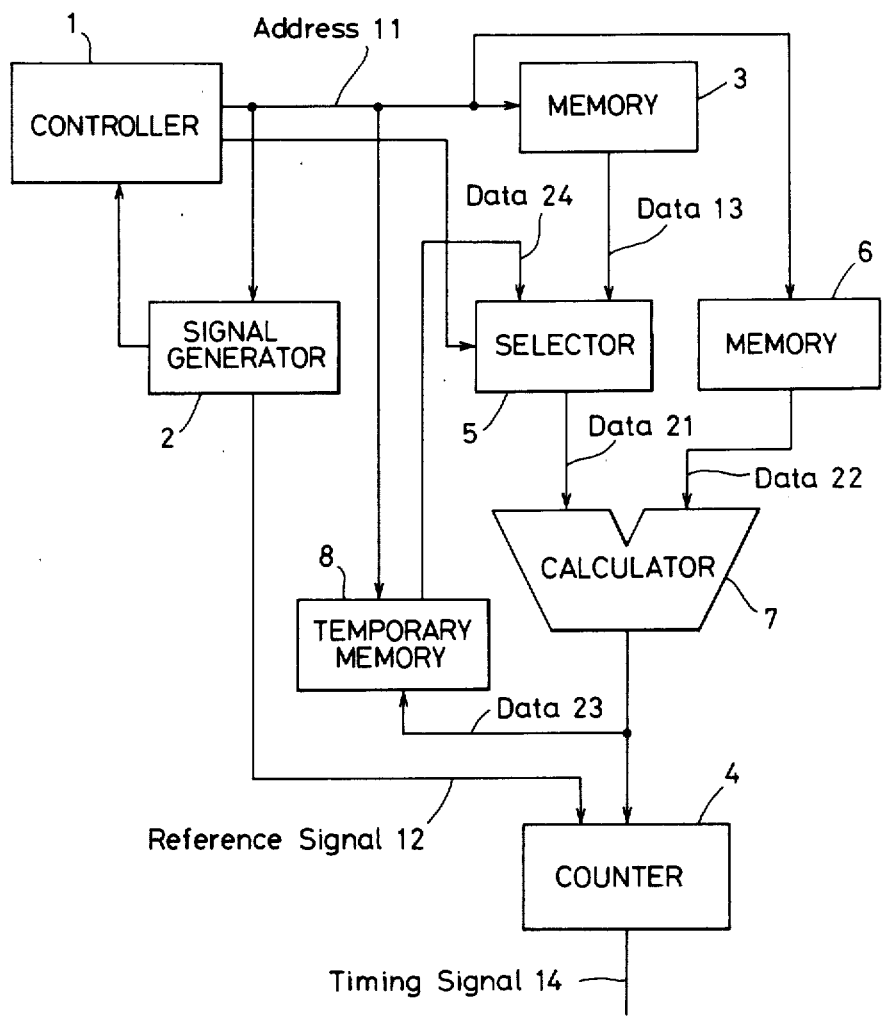
FIG. 1 is a block diagram showing a general arrangement of a timing signal generating apparatus according to an exemplary embodiment of the present invention.

FIG. 1 shows a general arrangement of the timing signal generating apparatus according to an exemplary embodiment of the present invention.

Figure 2:
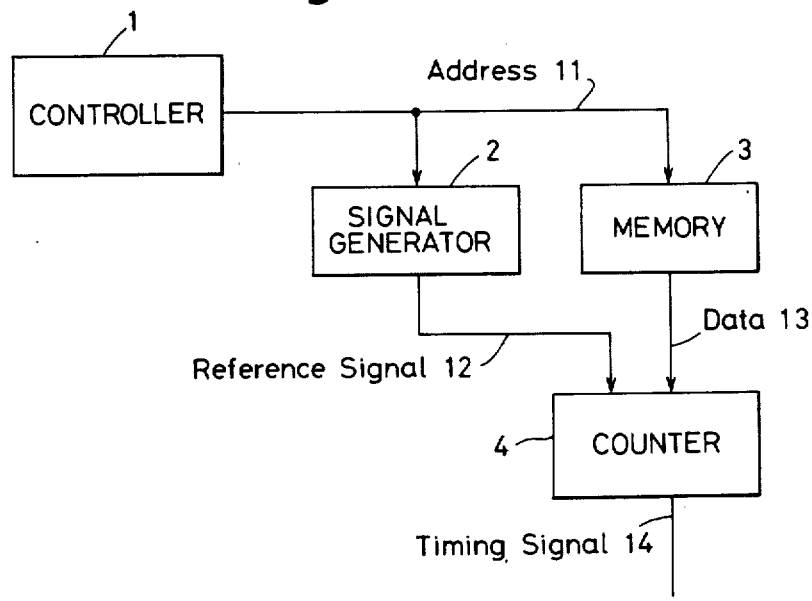
FIG. 2 is a block diagram showing an arrangement of a hitherto known timing signal generating apparatus.
Figure 3A:
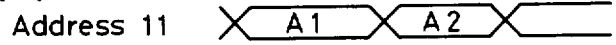
FIG. 3 (a-d) shows timing diagrams for illustrating operation of the apparatus shown in FIG. 2.
Figure 3B:
Figure 3C:
Figure 3D:

The arrangement shown in FIG. 1 differs from the hitherto known one shown in FIG. 2 in that a selector 5, a memory 6, an arithmetic unit or calculator 7 and a temporary memory 8 are additionally provided.

The selector 5 is supplied with data 13 and 24 from the memory 3 and the temporary memory 8, respectively, and produces at the output thereof either one of these input data under the command of the controller 1, the selected data being then supplied to the calculator or arithmetic unit 7. The memory 6 stores therein data 22 to be supplied to the calculator 7 as an addend.

The arithmetic unit or calculator 7 adds together the data 21 and 22 supplied from the selector 5 and the memory 6. Alternatively, the calculator 7 may be realized as a subtractor. The output data 23 of the calculator 7 is loaded in the counter 4 and at the same time supplied to the temporary memory 8.

FIG. 4 shows signals appearing at various circuit points in the apparatus shown in FIG. 1. More specifically, FIG. 4 shows at (a) an address signal 11 produced by the controller 1 as in the case of the signal shown in FIG. 3 at (a). A repetition of addresses A1 and A2 is illustrated. FIG. 4 shows at (b) a waveform of the same reference signal 12 as the one shown in FIG. 3 at (b) and similarly including the timing pluses P1 and P2. FIG. 4 shows at (c) the output data 13 of the memory 3 as with the case of the waveform (c) shown in FIG. 3. It will be seen that the data 13 contains the contents D1 and D2. Further, FIG. 4 illustrates at (d) the output data 21 of the selector 5 on the assumption that the selector 5 is closed to the memory 3. Accordingly, the output data 21 contains the same contents D1 and D2 as those shown in FIG. 4 at (c). There is shown in FIG. 4 at (e) the output data 22 of the memory 6 which includes data contents S1 and S2. FIG. 4 shows at (f) the output data 23 of the arithmetic unit 7. This data can be represented by a sum (D1+S1) for the address A1 shown in FIG. 4 at (a), while it is given by a sum (D2+S1) for the address A2. FIG. 4 shows at (g) the timing signal 14 produced by the counter 4 shown in FIG. 1. It will be seen that a timing signal pulse T3 is produced with a delay relative to the rise-up of the reference signal pulse P1 which delay corresponds to the time taken for the counter 4 to count the sum content (D1+S1) of the data 23. On the other hand, generation of the pulse T4 of the timing signal 14 is delayed relative to the rise-up of the pulse P2 of the reference signal 12 for a time required for the counter 4 to count the content (D2+S1) of the data 23. As will be seen in FIG. 4, it is possible to derive the timing signal pulses T3 and T4 having periods differing from those of the reference signal pulses P1 and P2, respectively.

Next, it is assumed that the selector 5 is closed to the temporary memory 8 under the command of the controller 1. Referring to FIG. 5 at (a), the address signal 11 produced by the controller 1 is composed of repetition of addresses A1 and A2 as in the case of the address signal shown in FIG. 4 at (a). It should however be noted that these addresses belong to the cycle which succeeds to the operation cycle illustrated in FIG. 4. The address signal 11 is applied to the temporary memory 8 to read out the data 24 therefrom. FIG. 5 shows at (b) the waveform of the reference signal 12 which is identical with the one shown in FIG. 4 at (b) and similarly includes the pulses P1 and P2. FIG. 5 shows at (c) the output data 24 of the temporary memory 8. It should be noted that the content (D1+S1) of the data 23 shown in FIG. 4 at (f) is placed in the temporary memory 8 at the address A1 designated by the address signal 11 while the content (D2+S1) is stored at the address A2 in the temporary memory 8. Accordingly, the data 21 shown in FIG. 5 at (d) is identical with the data 24 shown at (c) of the same figure. FIG. 5 shows at (e) the output data 22 of the memory 6 which contains data content S2 read out in this succeeding cycle, as will be seen in FIG. 4 at (e). FIG. 5 shows at (f) the output data 23 of the calculator or arithmetic unit 7 which assumes a sum value (D1+S1+S2) for the address A1 designated by the address signal 11 while assuming (D2+S1+S2) for the address A2. The data 23 shown in FIG. 5 at (f) is stored in the temporary memory 8. FIG. 5 shows at (g) the timing signal 14 outputted from the counter 4 shown in FIG. 1. It will be seen that the timing signal pulse T5 is generated with a delay with respect to the rise-up of the pulse P1 of the reference signal 12, which delay corresponds to the time taken for the counter 4 to count the content (D1+S1+S2) of the data 23. On the other hand, the timing signal pulse T6 undergoes a delay relative to the rise-up of the pulse P2 of the reference signal 12 which corresponds to the time required for the counter 4 to count the content (D2+S1+S2) of the data 23. As will be seen from FIG. 5, there can be derived the timing signal pulses T5 and T6 having respective periods which differ not only from those of the reference signal pulses P1 and P2 but also from the timing pulse signals T3 and T4 shown in FIG. 4 at (g).

It should further be noted that upon designation of the address A1 by the controller 1 as illustrated at the right-hand side of FIG. 5(a), the content (D1+S1+S2) of the data 23 stored in the temporary memory 8 is outputted as the data 24. When the selector 5 is closed to the temporary memory 8 at that time, the content (D1+S1+S2) is produced as the output data 21 of the selector 5. Consequently, the calculator 7 outputs the data 23 which corresponds to the content (D1+S1+2×S2) resulting from the addition of the data 21 and 22.

Since the address of the memory 3 to be read out and the data to be stored in the memory 6 as well as the storage sequence can be freely selected, it is possible to prepare the timing signals having periods differing from those of the reference signal (12) pulses P1 and P2 in addition to the timing signals T3, T4 shown in FIG. 4 at (g) and T5, T6 shown in FIG. 5 at (g).

As will now be appreciated from the foregoing description, the present invention allows the timing signals having respective periods differing from that of the reference signal 12 to be made available by virtue of such arrangement in which the selector 5, the memory 6, the calculator 7 and the temporary memory 8 are added to the conventional timing signal generating apparatus shown in FIG. 2 to control the connection of the selector 5 and reading of the memory 6. By using the timing signal generating apparatus according to the invention, the test of ICs having more than two enable input terminals as to the inter-terminal interference of timing signals can be accomplished at one time without necessity for repeating the test by varying the timing as with the case of the conventional apparatus.

It is thought that the present invention and many of its attendant advantages will be understood from the foregoing description and it will be apparent that various changes may be made in the form, construction and arrangement of the parts described herein without departing from the spirit and scope of the invention or sacrificing all of its material advantages, the form hereinbefore described being merely a preferred or exemplary embodiment thereof.

We claim:

1. A timing signal generating apparatus for producing timing signals asynchronously with respect to reference signals, comprising:
    a signal generator for producing a reference signal;
    a controller for generating a controller command;
    a first memory for storing data;
    a temporary memory for storing data;
    a selector for selecting either said data stored in said first memory or said data stored in said temporary memory based on said controller command;
    a second memory for storing data;
    an arithmetic unit for combining data stored in said second memory with data selected by said selector and for producing an arithmetic output representative of the combination thereof;
    said temporary memory being coupled to said arithmetic unit so as to store said arithmetic output; and
    a counter for receiving said arithmetic output and for counting to a value represented by said arithmetic output in response to said reference signal and for producing a timing signal with a delay relative to said reference signal which corresponds to the time required for said counter to count to said value.

2. A timing signal generating apparatus according to claim 1, wherein said arithmetic unit is constituted by an adder.

3. A timing signal generating apparatus according to claim 1, wherein said arithmetic unit is constituted by a subtractor.

* * * * *